United States Patent [19]

Burns et al.

[11] Patent Number: 5,277,826
[45] Date of Patent: Jan. 11, 1994

[54] LIME AND FLY ASH STABILIZATION OF WASTEWATER TREATMENT SLUDGE

[75] Inventors: Howard Burns, Atlanta, Ga.; Larry Gremminger, Dickinson, Tex.

[73] Assignee: Browning Ferris Industries, Houston, Tex.

[21] Appl. No.: 786,563

[22] Filed: Nov. 1, 1991

[51] Int. Cl.$^5$ ............................... C02F 1/68
[52] U.S. Cl. .................... 210/751; 210/764; 106/624; 106/697; 588/258
[58] Field of Search ............ 210/751, 764, 765; 106/697, DIG. 1, 624; 588/258

[56] References Cited

U.S. PATENT DOCUMENTS

| | | | |
|---|---|---|---|
| Re. 30,943 | 5/1982 | Nicholson | 106/85 |
| 1,672,584 | 6/1928 | Travers | 210/751 |
| 2,297,195 | 9/1942 | Behringer | 210/751 |
| 2,564,690 | 8/1951 | Havelin et al. | 210/751 |
| 2,852,584 | 9/1958 | Komline | 210/46 |
| 3,476,683 | 11/1969 | Liljegren | 210/8 |
| 3,852,084 | 12/1974 | Webster et al. | 106/118 |
| 4,028,130 | 6/1977 | Webster et al. | 210/751 |
| 4,038,095 | 7/1977 | Nicholson | 106/118 |
| 4,079,003 | 3/1978 | Manchak | 210/764 |
| 4,226,712 | 10/1980 | Kamei | 210/710 |
| 4,306,978 | 12/1981 | Wurtz | 210/750 |
| 4,432,800 | 2/1984 | Kneller et al. | 106/85 |
| 4,554,002 | 11/1985 | Nicholson | 71/12 |
| 4,781,842 | 11/1988 | Nicholson | 210/751 |
| 4,793,927 | 12/1988 | Meehan et al. | 210/751 |
| 5,051,031 | 9/1991 | Schumacher et al. | 210/751 |
| 5,217,624 | 6/1993 | Yamane et al. | 210/751 |

*Primary Examiner*—Thomas Wyse
*Attorney, Agent, or Firm*—Pravel, Hewitt, Kimball & Krieger

[57] ABSTRACT

This invention provides a process meeting the EPA's PFRP standard for WWTS treatment thereby producing a readily usable end-product in either soil-like form or semi-impermeable low load bearing, mass form. The process includes mixing WWTS with lime and fly ash, to cause a temperature increase to above 70° C. for at least 30 minutes and to cause the pH to exceed 12 for at least 2 hours. The end-product may be compacted to produce an semi-impermeable, durable mass or the soil-like product may be used as landfill cover material.

4 Claims, 3 Drawing Sheets

LIME AND FLY ASH STABILIZATION OF WASTEWATER TREATMENT SLUDGE

BACKGROUND OF THE INVENTION

1. Field of the Invention

The invention is a method of stabilizing wastewater treatment sludge (WWTS) by treating it with quick lime and fly ash to produce a stabilized composition that meets the U.S. Environmental Protection Agency (EPA) process for further reduction of pathogens (PFRP) standard. This stabilized material can be utilized as sanitary landfill cover material. The invention provides an environmentally sound method of reclaiming fly ash and sludge and converting these waste products into a useful end product.

2. Description of the Related Art

An urban, industrialized society produces large quantities of waste. Some of this waste is in the form of waters containing waste such as organic-laden sewage waters treated at municipal, commercial and industrial water treatment works, these wastewaters contain a variety of organic and inorganic compositions that are often treated onsite. Depending upon the treatment process, slurries high in suspended solids may be formed. These slurries, commonly referred to as sludges, are produced either by the concentration of solids originally in the waste water (e.g. primary sludge) or the formation of new suspended solids which result from the removal of dissolved solids from the waste water (primary and tertiary sludge).

The term "wastewater treatment sludge (WWTS)" as used in the specification and claims includes sludges produced from the treatment of organic-laden sewage waters such as the sludges produced by municipal, industrial and commercial wastewater treatment facilities, and the like. Thus, WWTS includes sludges produced from sewage subjected to primary treatment, sludges from sewage subjected to secondary treatment, and sludges subjected to tertiary treatment.

In some cases these sludges are digested or otherwise stabilized at the wastewater treatment facilities. In other cases the sludges may not be stabilized prior to disposal. In either case, these sludges may be or may become odoriferous and may contain a broad variety of bacteria, parasites, viruses and other pathogenic organisms.

Sludges that contain elevated levels of heavy metals are precluded or seriously inhibited from land application. Since large volumes of non-hazardous sewage sludge are produced and beneficial reuse of a large proportion of this sludge is inhibited due to metals and pathogen content, odor problems and seasonal restrictions on land application or land availability, it would be desirable to develop methods for converting these sludges into an odorless, stabilized end-product that is needed year round.

Coincidentally, large quantities of fly ash from the combustion of coal, lignite or wood are generated in this country. Fly ash is utilized as an additive in concrete, as a soil stabilization material or as a soil additive; however, large volumes are disposed of in sanitary landfills or abandoned mining excavations. These disposal methods may lead to ground water contamination, or consume valuable disposal capacity within sanitary landfills. Therefore, it would be desirable to develop additional methods that provide long term environmentally sound methods of utilizing fly ash in a beneficial manner that minimizes the consumption of landfill space.

The U.S. Environmental Protection Agency (EPA) has recognized the problems which disposal of pathogen infested waste can present. In response to these problems, the EPA has issued guidelines at 40 C.F.R. §257 concerning land disposal of sewage sludge which contains pathogens. The EPA regulations recognize three separate categories of sludge: unstabilized sludge; sludge exposed to a process to significantly reduce pathogens (PSRP); and sludge exposed to a process to further reduce pathogens (PFRP).

"Unstabilized sludge" has not been exposed to any pathogen reducing process, is not suitable for general land application, and can only be incinerated or landfilled. Sludge which undergoes a PSRP, such as an anaerobic digestion, heat treatment, lime stabilization, or air drying, can be disposed of on land only if public access to the land is controlled for a period of from 12 to 18 months. Finally, sewage which has undergone a PFRP has no disease-related restrictions on reuse. Unfortunately, known PFRP methods are expensive, highly energy intensive processes, such as irradiation or thermal processing, which are unsuitable for transforming sewage sludge into a readily usable end product.

If a treated sludge is to be readily usable, it is desirable that it meet the EPA's PFRP standard so that it poses a minimal risk of transferring diseases to humans. Further, it must not attract vectors and it must not be flammable. Also, if it is to be disposed of as landfill cover material, it must be readily spreadable with conventional equipment. In addition, it must also have a load bearing capability of at least one ton per square foot and have a permeability in the range $10^{-5}$ cm/sec to $10^{-6}$ cm/sec.

The early prior art recognizes the need to concentrate the waste contained in wastewaters for ease of treatment and disposal. For instance, U.S. Pat. No. 1,672,584 relates to the treatment of sewage with an alkaline composition, such as hydrated lime, to change the positively charged colloids, that make up the organic waste, into negatively charged colloids. These negatively charged colloids are then coagulated with an electrolyte, such as iron or aluminum sulfate. As an alternative, cement kiln dust could be used as the electrolytic coagulant. The high density of cement kiln dust is said to materially increase the settling rate of the precipitate formed.

U.S. Pat. No. 3,476,683 describes mixing sludge with lime. Heat is generated during this mixing due to the reaction of lime and water and the temperature increases to "more than 100° C." The sludge powder obtained is said to be "sterilized" by the heat generated.

Both of the above patents recognize the need to use inexpensive reagents, both use lime. Since large volumes of sludge must typically be treated, it is economically desirable to use inexpensive, readily available reagents to treat or stabilize the sludge. It is even more desirable to combine other waste products with the sludge if one could thereby both stabilize the sludge for disposal and dispose of the other waste products simultaneously.

U.S. Pat. No. 4,306,978 relates to the use of lime for the treatment of sludge to produce stabilized sludge pellets. A dewatered cake containing 10–60 wt. % of dry solids is mixed with 2–40 wt. % of lime, based on the dry solids weight. During this process, the temperature increases to the range 95°–100° C. due to the chemical reaction between lime and water. Further, this high temperature coupled with the high pH caused by the lime, is said to destroy bacteria and pathogenic organisms in the sludge. This treated mixture is then mechanically pelletized.

U.S. Pat. No. 4,226,712 is also directed to the treatment of sludge with lime to obtain a partially dried mixture. This mixture is then subjected to a second step of drying and granulation to produce a product suitable for use as fertilizer.

Similarly, U.S. Pat. No. 4,781,842 relates to a two-step process for treating sludge with lime, cement kiln dust, or lime kiln dust to raise the pH above 12 for at least about 2 hours and then drying the resulting mixture by an aeration process to produce a granular product. This process is said to meet USEPA PFRP standards and its product may be used as a fertilizer. U.S. Pat. No. 4,554,002 uses a similar process and suggests that fly ash may be substituted for cement kiln dust.

U.S. Pat. No. 4,793,927 is directed to a method of encapsulating sewage in an "impervious mass" with an "ammonia source" so that the ammonia released within the mass will destroy helminths, an organism that is difficult to destroy by other methods. The end product is a friable, clay-like material. The process meets EPA PFRP standards and the product is suitable for use as landfill cover, land reclamation material, fertilizer, etc. The method includes mixing the sewage with a setting agent and silicate in the volume ratio about 10:1:0.5. Suitable setting agents include Portland cement, lime and kiln dust. The silicate used is sodium silicate.

Fly ash is solid waste material that is readily available and that would be attractive to use as a reagent to treat and stabilize WWTS. Fly ash is produced as a residue of the combustion of coal, lignite, or wood and is an artificial pozzolan.

Early efforts to dispose of fly ash included combining dry fly ash and hydrated lime to produce a hydrated lime cement. U.S. Pat. No. 2,564,690 describes how to make such a cement and mix it with an aggregate and water to produce a composition capable of setting up to a high strength. U.S. Pat. No. 3,852,084 addresses the slow hardening of lime-fly ash cements and teaches milling of the lime and fly ash to increase their reactivity and increase the rate of hardening.

U.S. Pat. No. Re. 30,943 and U.S. Pat. No. 4,101,332 describe the use of a mixture of fly ash and cement kiln dust together with an aggregate, such as limestone, sand, blast furnace slag, gravel and the like, as a road stabilizer base. Thus, the mixture sets up to a hardened, load-bearing mass. Similarly, U.S. Pat. No. 4,038,095 is directed to a load bearing composition that includes fly ash, lime stack dust and an aggregate.

U.S. Pat. No. 4,432,800 is directed to a method of producing a hardened durable mass using beneficiated kiln dust which typically has low reactivity. The reactivity of the kiln dust is increased by the addition of lime, calcium hydroxide, or sodium hydroxide. The beneficiated dust can be used in conjunction with fly ash and an aggregate to produce a hardened durable mass.

The related art shows methods for concentrating sludges and methods for stabilizing sludges. Some of these methods do not meet the PFRP standard, indeed, only the methods of U.S. Pat. Nos. 4,793,927; 4,781,842 and 4,554,002 are said to meet this standard. Methods of these patents produce a friable, clay-like product.

U.S. Pat. No. 4,028,130 discloses a method of using digested sewage sludge producing a "hardenable composition" suitable for disposal in landfills. This method entails mixing the sewage sludge with hydrated lime and fly ash in the proportions (based on wt. % solids) 5–50% water, 1–15% hydrated lime, 1–50% sludge solids, 20–90% fly ash, 0–60% soil and 0–10% calcium sulfate. The patent does not mention the EPA's PFRP standard or that its hardenable composition meets this standard.

What is yet needed is a method of stabilizing WWTS to meet PFRP standards that utilizes readily available and inexpensive reagents to produce a solid material, either friable and clay-like, or a solid mass capable of supporting at least a low load, depending upon the quantity of reagents used, and that can be utilized safely and effectively as landfill cover.

SUMMARY OF THE INVENTION

The invention process combines WWTS with quick lime and fly ash in selected proportions to produce a product suitable for disposal as either landfill cover, fertilizer or a low load bearing material. The invention process meets the U.S. EPA's PFRP standard in that it subjects the WWTS to a pH of at least 12 for at least 2 hours and also heats the WWTS to at least 70° C. for at least 30 minutes.

In the invention method, WWTS is mixed with quick lime and fly ash. During this mixing process, heat is liberated as the lime hydrates causing the temperature to rise into the range 70°–75° C. and remain at levels above 70° C. for at least 30 minutes. Further, the addition of the lime to the WWTS causes the pH to increase to above about pH 12, where it is maintained for at least 2 hours. The fly ash is a pozzolan and, depending upon the degree of compaction of the solid product, the treated sludge product is obtained as either a friable, clay-like solid or a mass capable of supporting a relatively low load but not intended for the support of permanent structures. In either event, the treated product does not pose a significant risk to human health, does not attract vectors, and is not flammable. Further, in friable form it is readily spreadable for use as a landfill cover. Thus, the invention method uses an inexpensive reagent, lime, and a waste products, fly ash and WWTS, to produce a readily usable product.

DETAILED DESCRIPTION OF THE PREFERRED EMBODIMENTS

Figure 1:
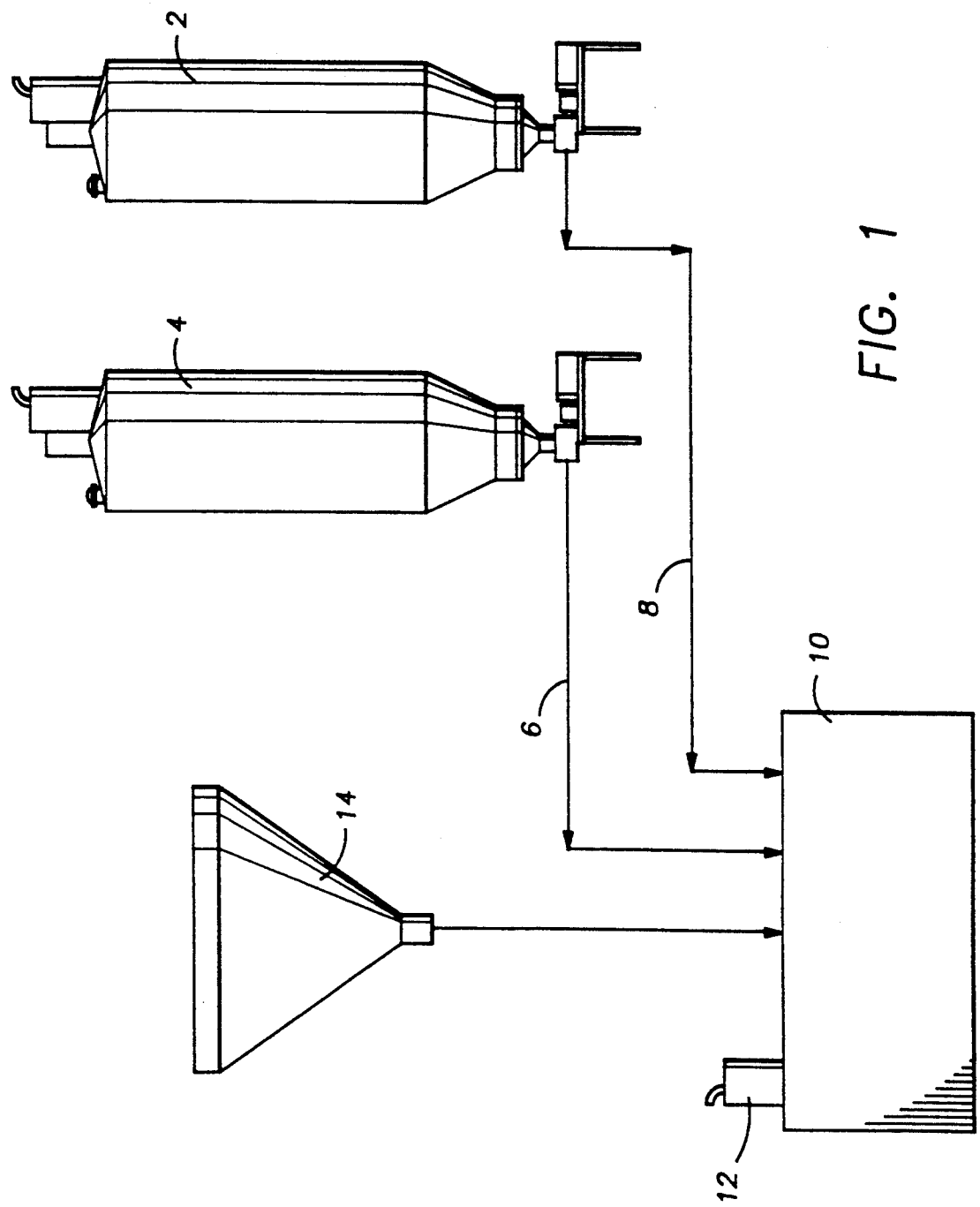
FIG. 1 is a Process Flow Diagram illustrating the invention process for treating WWTS.

The invention process treats WWTS to produce either a solid mass, capable of bearing a low load, or a friable, clay-like product that is easily spreadable and useful as landfill cover. Although the solid mass embodiment has a calculated load bearing capacity of about 19,500 psf, it is preferred to specify a conservative, allowable load bearing capability of about 6,000 psf. This is considered a material capable of bearing a low load, such as, normal vehicular loads typically encountered on a landfill.

"Landfill daily cover" as used in the specification and in the claims refers to cover used in sanitary landfills to cover waste and refuse farmed in the landfill sites. "Landfill" as used in the specification and claims refers to any material useful for filling in a geological depression or leveling the grade of a site as required.

In the specification and claims, the terms "lime" and "quick lime" refer to unhydrated lime.

In the invention process, solids generated during wastewater treatment processes are typically first concentrated to produce a WWTS containing from about 2 to about 8 wt. % solids based on final total dry solids content. These solids typically comprise organic matter, bacteria, viruses, pathogenic organisms and also, on occasion, heavy metals. In the invention process, it is preferred, but not necessary, that the WWTS be dewatered to a water content of from about 6 to about 22 wt. % based on final total dry solids content.

After concentration, the WWTS is then treated by the addition of quicklime and fly ash. The quicklime is preferably in a pulverized form for ease of mixing and rapid reaction with the water contained in the WWTS:

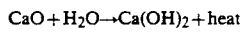

$$CaO + H_2O \rightarrow Ca(OH)_2 + heat$$

During this reaction heat is liberated thereby increasing the WWTS/lime mixture temperature to about 70°-90° C. The mix temperature may then be maintained above 70° C. for a period of at least 30 minutes. Further, the lime addition elevates the pH of the WWTS to above pH 12 for a period greater than 24 hours. Thus, the invention process meets the EPA's PFRP requirement that the WWTS be subjected to a pH of at least 12 for at least 2 hours and also that the WWTS be heated to at least 70° C. for at least 30 minutes.

In order to effect the above heating and pH treatment, lime should be added in a quantity sufficient to achieve a pH of at least 12 for about 2 hours but not in such excessive amount as to achieve an unacceptable level of toxicity in the end product. Thus, lime should be added in the range from about 50 to about 95 wt. % based upon the dry solids in the WWTS. Preferably, lime addition should be in the range of about 60 wt. % based on the dry WWTS solids content.

Fly ash is preferably added to the WWTS together with the lime. Fly ash, being a pozzolan, causes gradual hardening of the mixture and should generally be added in a quantity sufficient to avoid the retention of excessive amounts of free water in the product. To obtain a product with a water content that makes for ease of handling and storage, and that may be used as landfill cover without excessive delay in storage, fly ash should be added in the range about 85 to about 100 wt. % based on the water in the WWTS. Preferably, fly ash is added at about 95 wt. % based on the water in the WWTS.

While the above proportions of reagent addition will produce useful, disposable end products, it should be noted that reagent addition will vary considerably with sludge water content. In general, it has been found that WWTS with a low water content (high solids content) requires more lime to achieve the invention results. Further, such concentrated WWTS requires less fly ash. Fly ash is marginally less expensive than lime. Consequently, it is not economically desirable to dewater the sludge as far as possible, but solids handling considerations may dictate otherwise.

It is preferred that the lime and fly ash be added to the WWTS rapidly, while aggressively mixing, to ensure that heat is liberated at a sufficiently high rate to cause the temperature of the mixture to rise to the range 70°-75° C. Further, it is preferred that the mixture of lime, fly ash and WWTS be maintained under conditions that do not cause rapid heat loss, with consequent lowering of temperature, for at least about 30 minutes. Under these conditions, the EPA requirement that the WWTS be kept above 70° C. for at least 30 minutes will be met.

The addition of lime naturally causes the WWTS pH to increase to a level above pH 12. The pH level may be monitored for a period of 2 hours to ensure that it does not fall below this pH.

The handling of the treated end product determines the consistency of the end product, i.e., whether the end product is a semi-impervious, low load-bearing mass or friable and clay-like. If the treated waste is compacted, the low load-bearing mass that results is capable of bearing landfill traffic. On the other hand, if the treated waste is not compacted or is spread with low compaction equipment, an end-product of soil-like consistency results.

FIG. 1 illustrates a typical process system that can be used to practice the invention process. Fly ash and lime are stored in storage bins or silos 2, 4 respectively. These reagents are then transported by transport means 6, 8 such as a screw conveyors to a mixing vessel 10. The mixing vessel is desirably equipped with a dust collector 12 to prevent, or at least minimize, dust emissions. The mixing vessel 10 is also equipped with a high speed mixer (not shown) and may be baffled, depending upon the size and shape of the vessel. WWTS is collected in a hopper 14 that is preferably elevated to facilitate flow of the WWTS by gravity or pumping means to mixing vessel 10. All components of the mixture, lime, fly ash and WWTS are metered into the mixing vessel 10 in the desired proportions and mixed. The end product is withdrawn at the base of the mixing vessel 10.

The lime, fly ash and WWTS are continuously fed under rate-controlled conditions to the mixing vessel and the end-product is continuously removed from the mixing vessel. The residence time in the mixing vessel is relatively short, of the order of about 1-3 minutes, this being sufficient time to ensure complete mixing.

The soil-like end product is readily usable as daily landfill cover or road building material within the landfill. Thus, the invention allows the inexpensive treatment of WWTS to produce readily usable products.

The following examples serve to illustrate the invention, as described above and claimed hereafter, and do not limit the scope of the invention.

EXAMPLE 1

A sample of WWTS was obtained from the Blackhawk WWT facility at Friendswood, Tex. This WWTS, containing about 16 wt % solids, was processed in equipment like that shown in FIG. 1.

Figure 2:
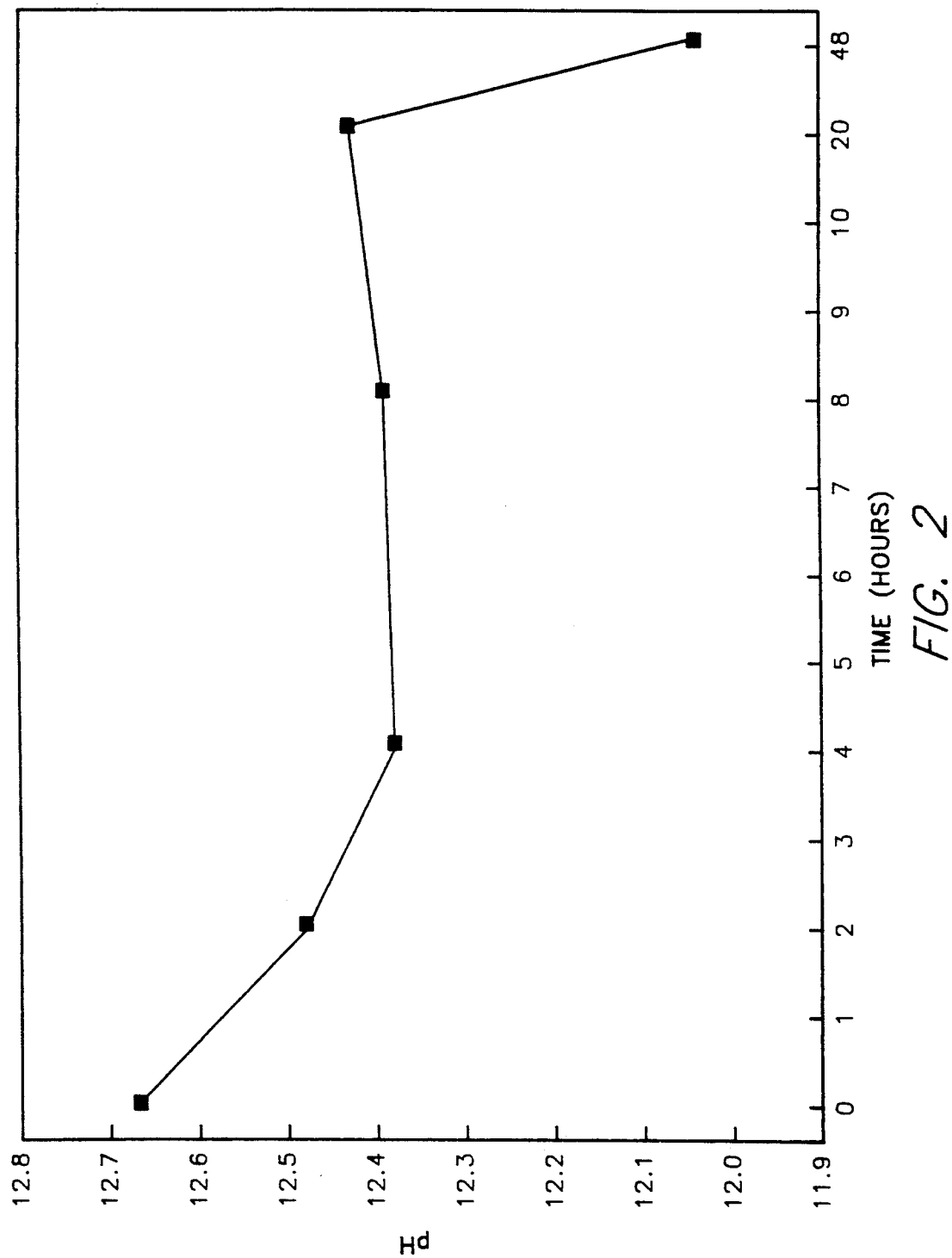
FIG. 2 is a graph showing the variation of pH with time.

The pH of the mixture of WWTS, fly ash and lime was monitored over time. 5 g samples of mixture were diluted with 30 ml deionized water and the pH of the resultant mixture was recorded The results are shown in FIG. 2.

Figure 3:
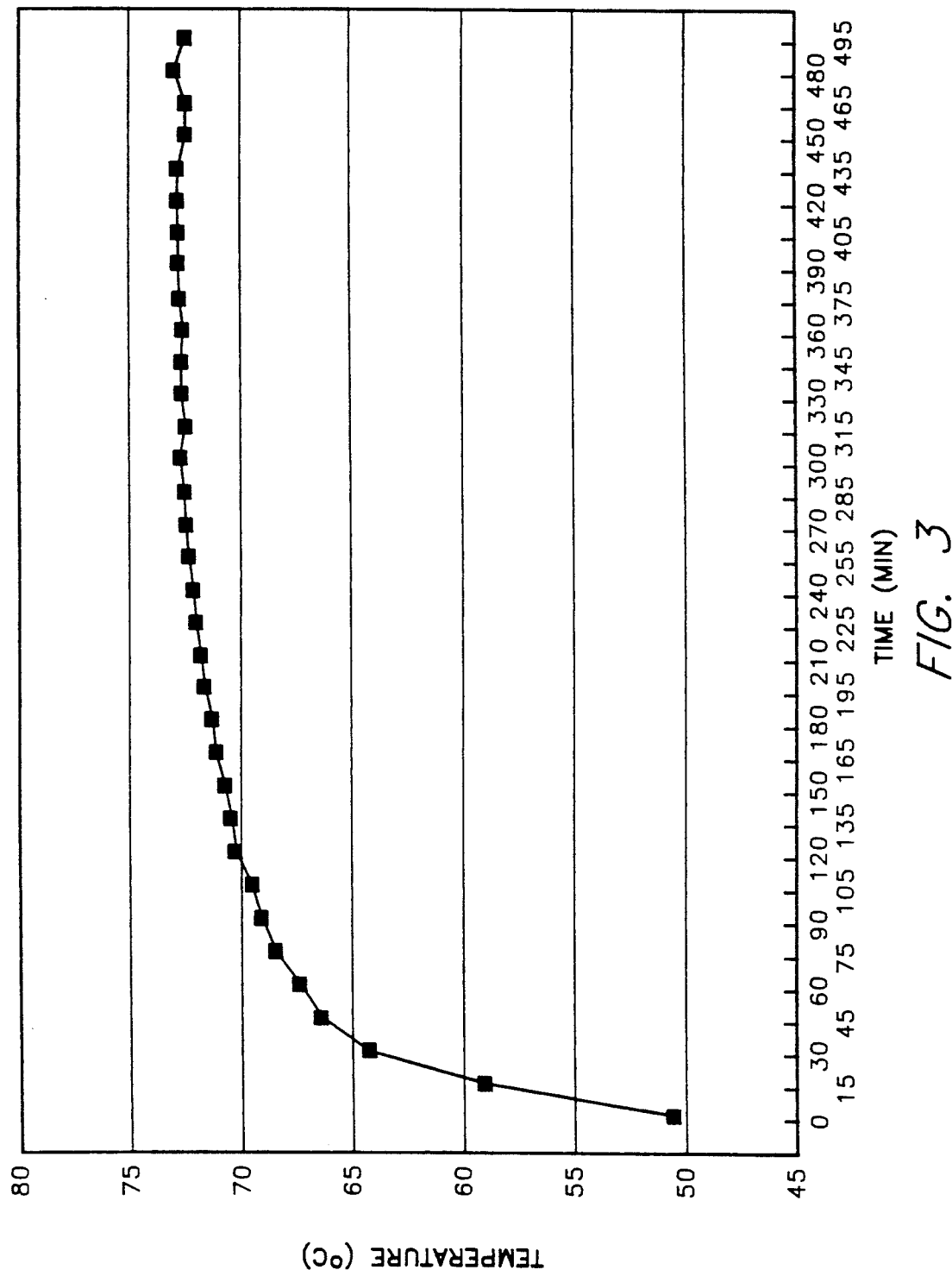
FIG. 3 is a graph showing the variation of temperature with time.

The temperature of the end product, which was collected in a large bin, was measured over time using a temperature probe. The results are shown in FIG. 3.

Samples of the Blackhawk WWTS were analyzed, before and after treatment by the invention method, for microbial count, metals, volatile organics, herbicides and pesticides. The results of these tests are shown in Table 1.

In order to monitor microbial count at various stages, the sample had to be "frozen" in terms of microbial content at the time of sampling. In order to do this, the treated sludge sample, taken at time, t, was neutralized to a pH of between 6 and 8 with 6N ice cold sulfuric acid. Survival counts of microbes with time are shown in Table 2.

TABLE 1

| Blackhawk WWTS | | |
| --- | --- | --- |
| | before | after |
| | mg/l | mg/l |
| Metals | | |
| Arsenic | <0.1 | <0.1 |
| Barium | 0.57 | 14.8 |
| Cadmium | <0.009 | <0.01 |
| Chromium | <0.05 | <0.05 |
| Lead | <0.1 | <0.1 |
| Mercury | .0005 | <0.0005 |
| Selenium | <0.08 | <0.05 |
| | μg/l | μg/l |
| Pesticides | | |
| Endrin | <1 | <0.7 |
| Lindane | <0.5 | <0.4 |
| Methoxychlor | <5 | <0.4 |
| Toxaphene | <12 | <5 |
| Chlordane | <6 | <5 |
| Heptachlor Epoxide | <0.05 | <0.4 |
| Heptachlor | <0.05 | <0.4 |
| Herbicides | | |
| 2,4-D | <3 | <4 |
| 2,4,5-TP | <0.05 | <0.8 |
| Volatiles | | |
| Vinyl chloride | 105 | 95 |
| 1,1-dichlorethene | 50 | 45 |
| Chloroform | 48 | 42 |
| 1,2-dichloroethane | 111 | 43 |
| 2-butanone | 2100 | 91 |
| Carbon tetrachloride | 43 | 38 |
| Trichloroethene | 53 | 37 |
| Benzene | 53 | 42 |
| Tetrachlorethene | 56 | 43 |
| Chlorobenzene | 56 | 43 |
| 1,4-dichlorobenzene | 118 | 77 |

TABLE 2

| Blackhawk WWTS Survival Count of Microbes at time, t, After Treatment t, hrs | | | | | |
| --- | --- | --- | --- | --- | --- |
| | sludge | 0 | 3 | 8 | 24 |
| Fecal Coliform | $6.5 \times 10^3$ | <3 | <3 | <3 | <3 |
| Fecal streptococci | $1.8 \times 10^4$ | <3 | <3 | <3 | <3 |
| Viable Ascaris eggs | <2 | <2 | <2 | <2 | <2 |
| Viable Toxocana eggs | 7 | <2 | <2 | <2 | <2 |
| Salmonella | $1.8 \times 10^3$ | <3 | <3 | <3 | <3 |

Note:
fecal coliform, fecal streptococci and salmonella are in MPN per gram of sludge solids while Ascaris and Toxocana are MPN per 100 g sludge solids.

The invention has been described with reference to its preferred embodiments. From the specification and claims, one of skill in the art may appreciate changes and modifications that may be made and that do not depart from the scope and spirit of the invention as disclosed above and claimed hereafter.

I claim:

1. A process for further reduction of pathogens in the treatment of waste water treatment sludges containing water, the process comprising:

mixing the sludge with lime in an amount sufficient to cause the temperature of the mixture to be maintained above 70° C. for at least about 30 minutes, and the pH of the mixture to be above 12 for at least about 30 minutes; and adding at least about 85 wt. % fly ash to the sludge, based upon the weight of water in the sludge;

whereby said mixing and adding to the sludge results in production of a soil-like product of sufficiently low fecal coliform, fecal streptococci, salmonella, ascaris egg and toxocana egg content to allow landfill disposal, said soil-like product being compactible under pressure into a load-bearing solid.

2. The process of claim 1 comprising mixing with from about 50 to about 95 wt. % lime, based upon the dry waste water treatment solids weight.

3. The process of claim 1 comprising mixing with from about 95 wt. % to about 100 wt. % ash based upon the weight of the water in the waste water treatment sludge.

4. The process of claim 3 comprising mixing with about 60 wt. % lime based upon the dry waste water treatment sludge solids weight.

* * * * *